United States Patent
Agarwal et al.

(10) Patent No.: US 8,326,689 B2
(45) Date of Patent: Dec. 4, 2012

(54) FLEXIBLE ADVERTISING SYSTEM WHICH ALLOWS ADVERTISERS WITH DIFFERENT VALUE PROPOSITIONS TO EXPRESS SUCH VALUE PROPOSITIONS TO THE ADVERTISING SYSTEM

(75) Inventors: Sumit Agarwal, San Carlos, CA (US); Gregory Joseph Badros, Mountain View, CA (US); John Fu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1169 days.

(21) Appl. No.: 11/228,583

(22) Filed: Sep. 16, 2005

(65) Prior Publication Data

US 2007/0067215 A1     Mar. 22, 2007

(51) Int. Cl.
*G06Q 30/00*     (2006.01)
(52) U.S. Cl. .................. 705/14.54; 705/14.43; 235/375
(58) Field of Classification Search ..................... 705/14
See application file for complete search history.

(56) References Cited

U.S. PATENT DOCUMENTS

| | | | |
|---|---|---|---|
| 2004/0103024 A1 | 5/2004 | Patel et al. | |
| 2005/0097204 A1 | 5/2005 | Horowitz | |
| 2006/0122879 A1* | 6/2006 | O'Kelley | 705/14 |
| 2006/0271389 A1* | 11/2006 | Goodman | 705/1 |
| 2007/0038508 A1* | 2/2007 | Jain et al. | 705/14 |
| 2007/0061328 A1* | 3/2007 | Ramer et al. | 707/10 |

FOREIGN PATENT DOCUMENTS

| | | |
|---|---|---|
| JP | 2003-076921 | 3/2003 |
| JP | HEI 17-190005 | 7/2005 |
| WO | WO 2005/006282 | 1/2005 |

OTHER PUBLICATIONS

Hicks, Matthew, "Google Reinvents AdWords with Auctioned CPM Ads," eWeek.com (Apr. 27, 2005) (Downloaded from http://www.eweek.com/c/a/Search/Google-Reinvents-AdWords-with-Auctioned-CPM-Ads/, pp. 1-4.).
PCT/ISA/220, "Notification of Transmittal of the International Search Report and the Written Opinion of the International Searching Authority, or the Declaration" for PCT/US06/36062, mailed Aug. 14, 2007 (1 pg.).
PCT/ISA/210, "International Search Report" for PCT/US06/36062, mailed Aug. 14, 2007 (2 pgs.).
PCT/ISA/237, "Written Opinion of the International Searching Authority" for PCT/US06/36062, mailed Aug. 14, 2007 (6 pgs.).
Examiner's First Report for Australian Patent Application No. 2006292491, mailed Aug. 21, 2009 (2 pgs.).

(Continued)

*Primary Examiner* — Alvin L Brown
(74) *Attorney, Agent, or Firm* — John C. Pokotylo; Straub & Pokotylo

(57) ABSTRACT

Different advertisers that may have different value propositions and that may desire different types of ad spots may effectively participate in an advertising network. An advertiser may express various value propositions using various types of offers, such as offers (or maximum offers) per impression, selection, and/or conversion (or some other user event). Probabilities of events, associated with offers, occurring may be used to allow different advertisers with different value propositions to compete against one another in an arbitration such as an auction. Advertisers may target the serving of their ads to keywords (search and/or content), particular publications or properties, particular vertical categories, other types of ad spots, etc.

9 Claims, 8 Drawing Sheets

OTHER PUBLICATIONS

Translation of Notice of Reasons for Rejection for Japanese Patent Application No. 2008-531363, mailed Feb. 15, 2011 (2 pgs.).
Communication for European Patent Application No. 06 803 690.4-2221, mailed on Mar. 2, 2010 (1 pg.).
Notice of Preliminary Rejection for Korean Patent Application No. 10-2008-7009120, mailed Mar. 31, 2010 (8 pgs.) with translation (9 pgs.).
Re-Examination Report for Korean Patent Application No. 10-2008-7009120, mailed May 24, 2011 (2 pgs.) with translation (2 pgs.).
Notice of Reasons for Rejection for Japanese Patent Application No. 2008-531363, mailed Jun. 14, 2011 (3 pgs.) with translation (2 pgs.).
Notification of the First Office Action for Chinese Patent Application No. 200680042752.8, dated Jul. 14, 2010 (3 pgs.) with translation (5 pgs.).
Notification of the Second Office Action for Chinese Patent Application No. 200680042752.8, mailed Aug. 24, 2011 (4 pgs.) with translation (7 pgs.).
Office Action for Israeli Patent Application No. 190132, mailed Sep. 18, 2011 (3 pgs.).
Notice of Preliminary Rejection of Korean Patent Application No. 10-2011-7008597, mailed Oct. 7, 2011 (3 pgs.) with translation (3 pgs.).
Extended European Search Report for European Patent Application No. 06803690.4, mailed Nov. 23, 2009 (4 pgs.).
Examiner's Report for Australian Patent Application No. 2006292491, mailed Nov. 25, 2010 (2 pgs.).
Notice of Final Rejection for Korean Patent Application No. 10-2008-7009120, mailed Dec. 29, 2010 (4 pgs.) with translation (4 pgs.).
Examiner's Report for Canadian Patent Application No. 2,622,655, Feb. 20, 2012 (4 pgs.).

* cited by examiner

| DESIRED CHARACTERISTIC OF AD SPOT | VALUE$_{IMPRESSION}$ | VALUE$_{SELECTION(CLICK)}$ | {EVENT, VALUE$_{EVENT}$, PROBABILITY$_{EVENT}$} |
|---|---|---|---|
| ARBITRARY EVENT | *OFFER* | *OFFER* | *EVENT*, *OFFER*, *PROBABILITY* |
| SEARCH | *OFFER* | *OFFER* | |
| SEARCH, KEYWORD K$_1$ | *OFFER* | *OFFER* | |
| ... | ... | ... | |
| SEARCH, KEYWORD K$_n$ | *OFFER* | *OFFER* | |
| CONTENT | *OFFER* | *OFFER* | |
| CONTENT, PUBLICATION$_1$ | *OFFER* | *OFFER* | |
| ... | ... | ... | |
| CONTENT, PUBLICATION$_m$ | *OFFER* | *OFFER* | |
| VERTICAL$_1$ | *OFFER* | *OFFER* | |
| ... | ... | ... | |
| VERTICAL$_p$ | *OFFER* | *OFFER* | |

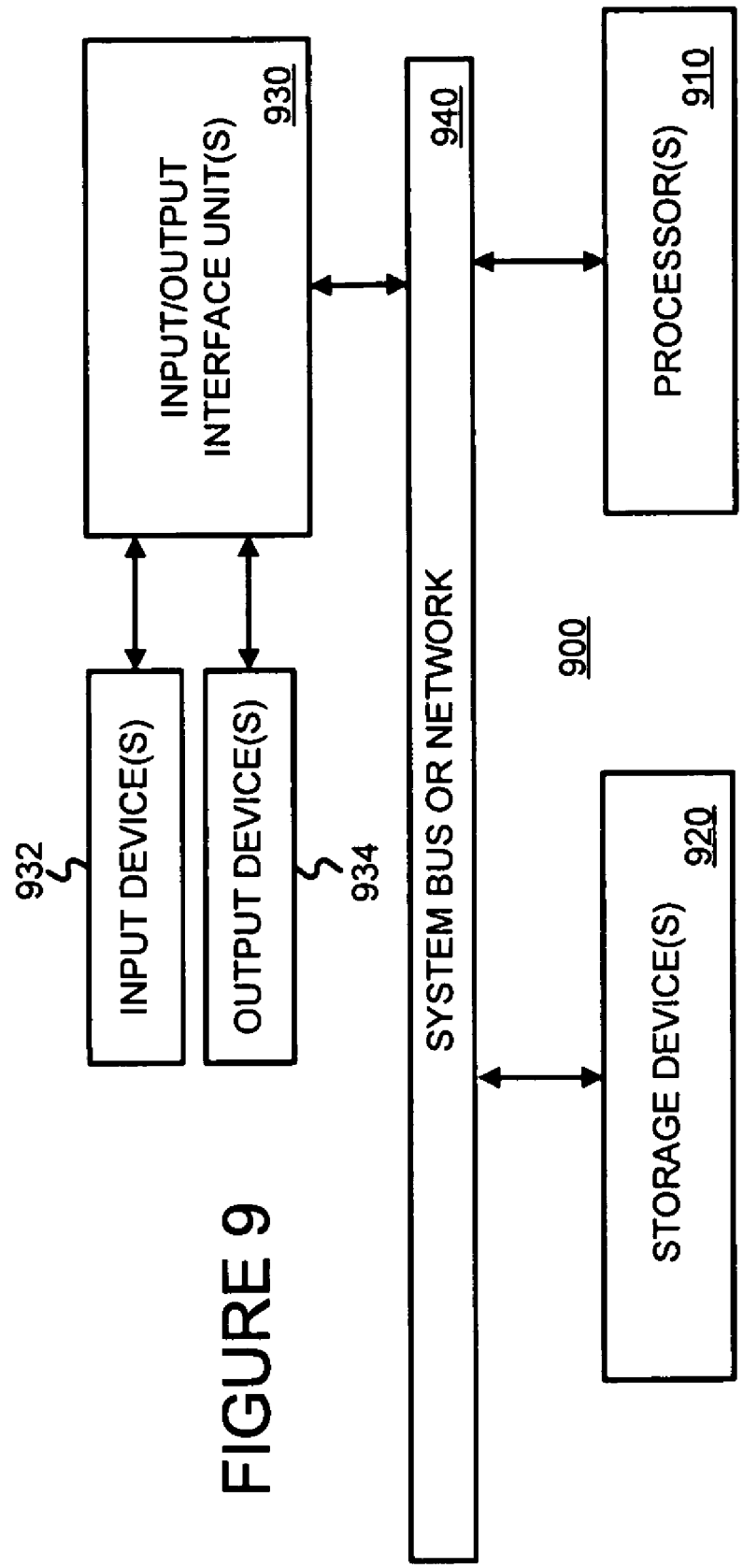

FLEXIBLE ADVERTISING SYSTEM WHICH ALLOWS ADVERTISERS WITH DIFFERENT VALUE PROPOSITIONS TO EXPRESS SUCH VALUE PROPOSITIONS TO THE ADVERTISING SYSTEM

§1. BACKGROUND OF THE INVENTION

§1.1 Field of the Invention

The present invention concerns advertising, such as online advertising for example. In particular, the present invention concerns helping an advertising system to allow different advertisers, with different value-propositions, to compete against one another for various ad spots.

§1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.). Query keyword targeting has been used by search engines to deliver relevant ads. For example, the AdWords advertising system by Google Inc. of Mountain View, Calif. (referred to as "Google"), delivers ads targeted to keywords from search queries. Similarly, content targeted ad delivery systems have been proposed. For example, U.S. patent application Ser. No. 10/314,427 (incorporated herein by reference and referred to as "the '427 application"), titled "METHODS AND APPARATUS FOR SERVING RELEVANT ADVERTISEMENTS", filed on Dec. 6, 2002 and listing Jeffrey A. Dean, Georges R. Harik and Paul Buchheit as inventors; and Ser. No. 10/375,900 (incorporated by reference and referred to as "the '900 application"), titled "SERVING ADVERTISEMENTS BASED ON CONTENT," filed on Feb. 26, 2003 and listing Darrell Anderson, Paul Buchheit, Alex Carobus, Claire Cui, Jeffrey A. Dean, Georges R. Harik, Deepak Jindal and Narayanan Shivakumar as inventors, describe methods and apparatus for serving ads relevant to the content of a document, such as a Web page for example. Content targeted ad delivery systems, such as the AdSense advertising system by Google for example, have been used to serve ads on Web pages.

As can be appreciated from the foregoing, serving ads relevant to concepts of text in a text document and serving ads relevant to keywords in a search query are useful because such ads presumably concern a current user interest. Consequently, such online advertising has become increasingly popular. Moreover, advertising using other targeting techniques, and even untargeted online advertising, has become increasingly popular. However, such advertising systems still have room for improvement.

For example, different kinds of advertisers have different value propositions. Consider, for example, three (3) different advertisers intended to be representative of broad segments. Assume that, representative of the first broad segment, advertiser NIKE is primarily interested in building their brand and is most interested in impressions on recognizable publisher Websites that they know their target audience visits. Assume that, representative of the second broad segment, advertiser WINZIP is primarily interested in getting users to download and install their software which is available from the landing page of their ad. WINZIP is therefore most interested in ad selections (sometimes referred to in the specification as "clicks" without loss of generality). Finally, assume that, representative of the third broad segment, advertiser BOOKCLUB wants users to buy books from their Website and is willing to share specific conversion data when purchases are made.

Thus, from the perspective of an advertising network, NIKE reports a very non-specific value, perhaps because it expects impressions (also referred to as "view-throughs") to lead to conversions that it cannot track effectively (or that it does not wish to share with the advertising network). WINZIP concerns itself with more specific value (i.e., clicks). BOOKCLUB focuses on the most specific value (i.e., actual purchases by the user). Suppose that the perceived value proposition for these advertisers is as follows:

NIKE: $1 per 1,000 impressions (i.e., $1 CPM);
WINZIP: $0.50 per click; and
BOOKCLUB: $1-$20 per book purchase, depending on the book.

As will be illustrated below, current advertising networks are typically focused on capturing one type of value proposition, to the detriment of the other two.

Consider first, an advertising network that accepts cost per selection offers from advertisers, and that charges advertisers when users actually click on their ads. These offers may be referred to as "cost per click" or "CPC" offers. The current AdWords and AdSense advertising networks from Google are examples of such an ad network. Naturally, this type of advertising network works well for WINZIP, because it matches WINZIP's value proposition closely. WINZIP can offer $0.50 per click, and end up paying $0.50 (or less if discounted) for each click.

Unfortunately, however, this type of advertising network does not work well for NIKE and BOOKCLUB. More specifically, although NIKE derives its value from impressions, it needs to model (or convert) its value to a cost per selection offer. Specifically, NIKE would need to derive a CPC offer from a CPM offer that matches its value proposition. It could do so by using a selection rate (referred to as "click-through rate" or "CTR" in the specification without loss of generality). For example, CPM can be estimated as CPC*CTR, so NIKE can simply solve for CPC and get CPC=CPM/CTR. While NIKE knows what it wants as its CPM, CTR is beyond its control, and is potentially unstable. Consequently, NIKE is faced with a management challenge. Specifically, if NIKE's CPM value is estimated to be constant, as CTR goes down, its starts offering (and paying) less for those impressions. Conversely, as CTR goes up, it may end up offering too much and over-paying for impressions. To avoid making offers that are too high or too low, NIKE must use CTR (e.g., as reported to it by the advertising network) to adjust its offer on a regular basis to make their estimated CPM relatively constant to match their value.

BOOKCLUB also has a problem. It may have offline-data (or use conversion tracking) to understand how frequently a click leads to a purchase, and to know how valuable those purchases are to it. Its value per click may be estimated to be the weighted sum of products of the conversion rate*conversion values. BOOKCLUB can compute a CPC offer from conversation rate and conversion values. However, as the conversion rates change, BOOKCLUB will, like NIKE, have to regularly update their CPC offer to reflect the most current data in order to avoid offering too much or too little.

As can be appreciated from the foregoing example, an advertising network that only accepts cost per selection offers from advertisers would be useful to WINZIP, but would cause problems (e.g., in terms of ease of management of an ad campaign) for NIKE and BOOKCLUB.

Now consider an advertising network where advertisers make offers (e.g., bids) strictly for impressions. These offers may be referred to as "cost per (thousand) impressions" or "CPM" offers. In such an ad network, it would be easier for NIKE to manage its ad campaign because the form of the offer matches its value proposition. That is, NIKE would simply bid $1.00 CPM. However, since WINZIP measures its value in terms of selections (e.g., clicks), it would need to convert its CPC value to a CPM offer. It could determine its CPM based on the CTR and their value per click using the formula CPM=CPC*CTR. To avoid making offers that are too high or too low, WINZIP must use CTR (e.g., as reported to it by the advertising network) to adjust its offer on a regular basis to make their estimated CPM relatively constant to match their value. BOOKCLUB has to do something similar, but needs to make its determination over the weighted sum of CTR*CONVERSION_RATE*VALUE for all of their conversion data. In this scenario, WINZIP and BOOKCLUB are forced to regularly update their CPM offer in order to reflect their value proposition.

As can be appreciated from the foregoing example, an advertising network that only accepts cost per (thousand) impression offers from advertisers would be useful to NIKE, but would cause problems (e.g., in terms of ease of management of an ad campaign) for WINZIP and BOOKCLUB.

Finally, consider an advertising network in which advertisers make offers (e.g., bids) for conversions. These offers may be referred to as "cost per acquisition" or "CPA" offers. For this ad network, to avoid overpaying or underpaying, NIKE would have to use observed data about CTR or other conversion rates to back-compute the value of those conversions to reflect their value on impressions. Similarly, WINZIP would have to use observed data about conversion rates (from clicks) to back-compute the value of those conversions to reflect their value on selections (clicks). With this system, BOOKCLUB gets to make offers (bids) that reflect its value directly. As can be appreciated from the foregoing example, an advertising network that accepts only cost per acquisition offers from advertisers would be useful to BOOKCLUB, but would cause problems (e.g., in terms of ease of management of an ad campaign) for NIKE and WINZIP.

As the exemplary scenarios involving three (3) different types of advertising networks and three (3) different types of advertisers illustrate, different advertisers have different value propositions that are modeled better with certain types of offers than they can be modeled with other types of offers. Thus, an improved advertising network would be useful.

Another problem with some existing advertising networks is that some advertisers value impressions on so-called top-tier publications (e.g., The New York Times, Sports Illustrated, etc.) (much) more than impressions of other publications. For example, NIKE may want to be able to pay a premium to get impressions on top-tier publishers. The dual problem facing top-tier publishers is that they are unable to monetize their publication's (e.g., Website's) brand (relative to the masses of other less prominent publications) using existing advertising network products. For example, human judgment is often used to determine the price paid for pay-per-impression ads (e.g., often based on the type of audience attracted to a Website as well and the likelihood that the ad will reach its intended audience). Often, when advertisers buy ad placements from large publishers, they are shown the places their ads will run and a direct sales force negotiates a price based on the inventory viewed. Currently it is required that people on behalf of the Web publisher and the advertiser negotiate a price.

The foregoing customs of pay-per-impression advertising have a number of disadvantages. First, to be diligent, the advertiser must review each Website and go through laborious negotiations for each Website, and possibly each placement, to set the price to be paid for ad impressions. This human involvement and per channel pricing does not scale to allow purchase—on a price per impression basis—of ad spots displayed on a large network of Websites.

To avoid this scalability problem, many large advertising networks sell ads on a CPC basis. Unfortunately, as illustrated by the example above, CPC advertising networks do not serve the needs of so-called "brand" advertisers, who may just want to get a message across without requiring a click (e.g. "Watch Alias. Now on Wed. nights on ABC", or "Diet Pepsi—Light! Crisp! Refreshing!") well, nor do they serve the needs of advertisers like BOOKCLUB well.

Consequently, top-tier premium publishers may be reluctant to join advertising networks such as the AdSense advertising network from Google because they are unable to extract value from advertisers beyond what the rest of the network receives. As mentioned above, some brand advertisers have the dual problem in that they wish to pay a premium to run on certain publications. Some ad networks currently do not allow advertisers to express their desire for specific publications (e.g., Websites) or vertical segments, and therefore cannot collect additional revenue to provide the improved monetization to those premium publishers. Therefore, it would be useful to improve these existing advertising networks.

It would be useful if such an improved advertising network allowed different advertisers with different value propositions to be able to directly express (i.e., without the need to track selection rates, conversion rates, etc. and recalculate offers based on these rates) their value propositions. It would be useful if such an improved advertising network allowed advertisers to offer more for placement (or selection, or conversion, or some other event) on certain (e.g., top-tier, premium) publications, or for particular vertical segments. At the same time, it would be useful if such an improved advertising system would allow advertisers to choose the level of detail at which they wish to express their value. For example, advertisers should remain free to keep conversion data private. It would also be useful for such an improved advertising network to give greater control to advertisers who desire it, yet maintain simplicity for advertisers who prefer ease of use.

§2. SUMMARY OF THE INVENTION

Embodiments consistent with the present invention may be used to allow different advertisers that may have different value propositions and that may desire different types of ad spots to participate in an advertising network. An advertiser may express various value propositions using various types of offers, such as offers (or maximum offers) per impression, selection, and/or conversion (or some other user event). Probabilities of events, associated with offers, occurring may be used to allow different advertisers with different value propositions to compete against one another in an arbitration such as an auction. Advertisers may target the serving of their ads to keywords (search and/or content), particular publications or properties, particular vertical categories, other types of ad spots, etc.

§3. BRIEF DESCRIPTION OF THE DRAWINGS

FIG. 6 is an exemplary template through which an advertiser can specify desired ad spot characteristics and enter different types of offers.

FIG. 9 is a block diagram of apparatus that may be used to perform at least some operations, and store at least some information, in a manner consistent with the present invention.

§4. DETAILED DESCRIPTION

Figure 1:
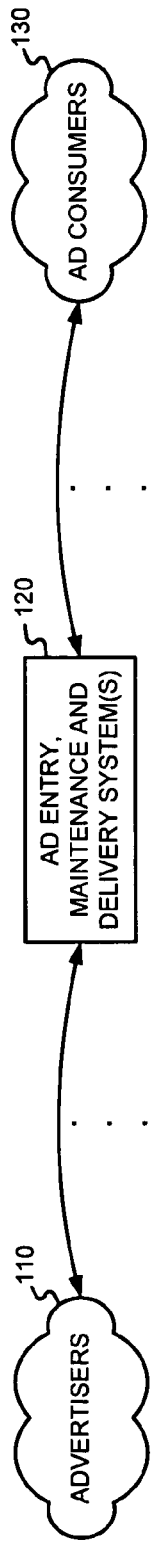
FIG. 1 is a diagram showing parties or entities that can interact with an advertising system.

The present invention may involve novel methods, apparatus, message formats, and/or data structures for providing a flexible advertising network in which different advertisers with different value propositions can directly express such value propositions (e.g., in terms of offers for various events) and in which advertisers can avoid or reduce the need to readjust the expression of their value propositions. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention to include any patentable subject matter described.

In the following definitions of terms that may be used in the specification are provided in §4.1. Then, environments in which, or with which, the present invention may operate are described in §4.2. Exemplary embodiments of the present invention are described in §4.3. Thereafter, a specific example illustrating the utility of one exemplary embodiment of the present invention is provided in §4.4. Finally, some conclusions regarding the present invention are set forth in §4.5.

§4.1 Definitions

Online ads, such as those used in the exemplary systems described below with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, user device characteristics, etc.), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document, on which, or with which, the ad is to be served, includes certain topics or concepts, or falls under a particular cluster or clusters, or some other classification or classifications (e.g., verticals). In some systems, an advertiser may specify that its ad is to be served only to (or is not to be served to) user devices having certain characteristics. Finally, in some systems an ad might be targeted so that it is served in response to a request sourced from a particular location, or in response to a request concerning a particular location.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) and the ratio of the number of conversions to the number of selections (or the number of some other earlier event) are both referred to as the "conversion rate." The type of conversion rate will be apparent from the context in which it is used. If a conversion is defined to be able to occur within a predetermined time since the serving of an ad, one possible definition of the conversion rate might only consider ads that have been served more than the predetermined time in the past.

A "property" is something on which ads can be presented. A property may include online content (e.g., a Website, an MP3 audio program, online games, etc.), offline content (e.g., a newspaper, a magazine, a theatrical production, a concert, a sports event, etc.), and/or offline objects (e.g., a billboard, a stadium score board, and outfield wall, the side of truck trailer, etc.). Properties with content (e.g., magazines, newspapers, Websites, email messages, etc.) may be referred to as "media properties." Although properties may themselves be offline, pertinent information about a property (e.g., attribute(s), topic(s), concept(s), category(ies), keyword(s), relevancy information, type(s) of ads supported, etc.) may be available online. For example, an outdoor jazz music festival may have entered the topics "music" and "jazz", the location of the concerts, the time of the concerts, artists scheduled to appear at the festival, and types of available ad spots (e.g., spots in a printed program, spots on a stage, spots on seat backs, audio announcements of sponsors, etc.).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

A "Web document" includes any document published on the Web. Examples of Web documents include, for example, a Website or a Web page.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Firefox, etc.), a media player (e.g., an MP3 player, a Realnetworks streaming audio file player, etc.), a viewer (e.g., an Abobe Acrobat pdf reader), etc.

A "content owner" is a person or entity that has some property right in the content of a media property (e.g., document). A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary. A "Web publisher" is an example of a content owner.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

"Sensing" can mean either of, or both of, receiving information below a threshold of conscious perception ("subliminal") and being aware of received information ("perceive").

An "event" is something that the user does or that happens to the user. An event may provide an advertiser with value as a result of an advertisement.

An "immediate event" is an event that is tied directly to a precise occurrence that an ad serving system can measure. For example, impressions are immediate perception-based events, and clicks are immediate click-based events. For an immediate event, the advertiser need not inform the ad serving system about the occurrence of the event since the ad serving system will be aware of the event.

A "deferred event" is any event that is not an immediate event. An ad serving system relies on reporting by an advertiser reporting (e.g., via a conversion tracking mechanism) to become aware of deferred events. Deferred events are what are typically meant by the term "conversion".

A "perception-based event" is an event that happens after an ad is perceived (e.g., viewed by) a user, but not selected (e.g., clicked) by that user. An example of perception-based events includes the purchase of a Coke at the local gym after viewing, but not selecting, a Coke ad.

A "click-based event" is an event that occurs after an ad is selected by the user. One example of a click-based event is the immediate click-based delivery of the landing-page of the advertisement to the user's browser. Other examples of click-based events include purchasing a book or downloading software from an ad landing page. It is possible for click-based events to occur after a significant delay from the time of the click (e.g., bookmarking a landing page and, weeks later, sharing that favorite with a friend).

§4.2 Exemplary Advertising Environments in which, or with which, the Present Invention may Operate FIG. 1 is a diagram of an advertising environment. The environment may include an ad entry, maintenance and delivery system (simply referred to as an ad server) 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or selection related to the ad occurred) to the system 120. This usage information may include measured or observed user behavior related to ads that have been served.

The ad server 120 may be similar to the one described in the '900 application. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, etc.), and price information (e.g., cost, average cost, or maximum cost (per impression, per selection, per conversion, etc.)). Therefore, a single cost, a single maximum cost, and/or a single average cost may be associated with one or more keywords, and/or topics. As stated, each ad group may have one or more ads or "creatives" (That is, ad content that is ultimately rendered to an end user.). Each ad may also include a link to a URL (e.g., a landing Web page, such as the home page of an advertiser, or a Web page associated with a particular product or server). Naturally, the ad information may include more or less information, and may be organized in a number of different ways.

Figure 2:
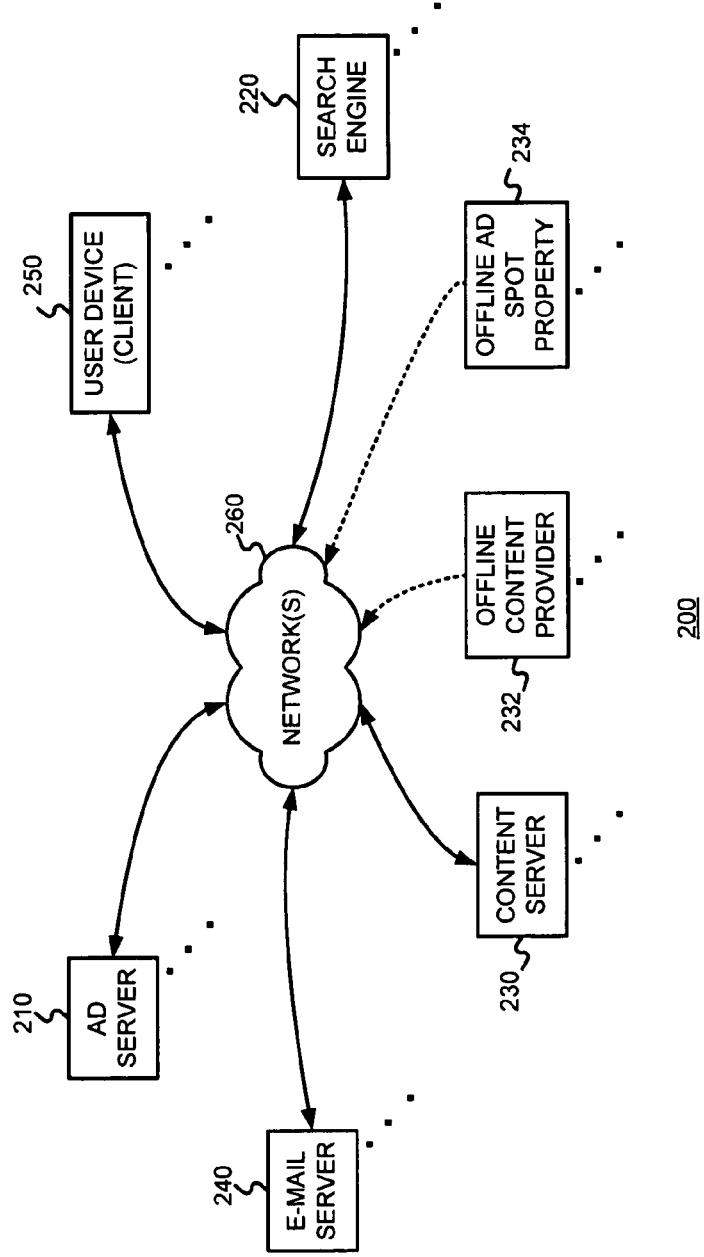
FIG. 2 is a diagram illustrating an environment in which, or with which, embodiments consistent with the present invention may operate.

FIG. 2 illustrates an environment 200 in which the present invention may be used. A user device (also referred to as a "client" or "client device") 250 may include a browser facility (such as the Explorer browser from Microsoft, the Opera Web Browser from Opera Software of Norway, the Navigator browser from AOL/Time Warner, the Firefox browser from Mozilla, etc.), an e-mail facility (e.g., Outlook from Microsoft), etc. A search engine 220 may permit user devices 250 to search collections of documents (e.g., Web pages). A content server 310 may permit user devices 250 to access documents. An e-mail server (such as GMail from Google, Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220. However, content-relevant ads may be served in association with content provided by the content server 230, and/or e-mail supported by the e-mail server 240 and/or user device e-mail facilities.

As discussed in the '900 application, ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, selection or not, impression time, impression date, size, conversion or not, etc.) back to the ad server 120/210. Alternatively, or in addition, such information may be provided back to the ad server 120/210 by some other means.

The offline content provider 232 may provide information about ad spots in an upcoming publication, and perhaps the publication (e.g., the content or topics or concepts of the content), to the ad server 210. In response, the ad server 210 may provide a set of ads relevant the content of the publication for at least some of the ad spots. Examples of offline content providers 232 include, for example, magazine publishers, newspaper publishers, book publishers, offline music publishers, offline video game publishers, a theatrical production, a concert, a sports event, etc.

Owners of the offline ad spot properties 234 may provide information about ad spots in their offline property (e.g., a stadium scoreboard banner ad for an NBA game in San Antonio, Tex.). In response, the ad sever may provide a set of ads relevant to the property for at least some of the ad spots.

Examples of offline properties 234 include, for example, a billboard, a stadium score board, and outfield wall, the side of truck trailer, etc.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where, and/or how the ad was to be rendered (e.g., position, selection or not, impression time, impression date, size, conversion or not, etc.) back to the ad server 120/210. Alternatively, or in addition, such information may be provided back to the ad server 120/210 by some other means.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under over, or otherwise in association with an e-mail.

Although the foregoing examples described servers as (i) requesting ads, and (ii) combining them with content, one or both of these operations may be performed by a client device (such as an end user computer for example).

§4.3 Exemplary Embodiments

Figure 3:
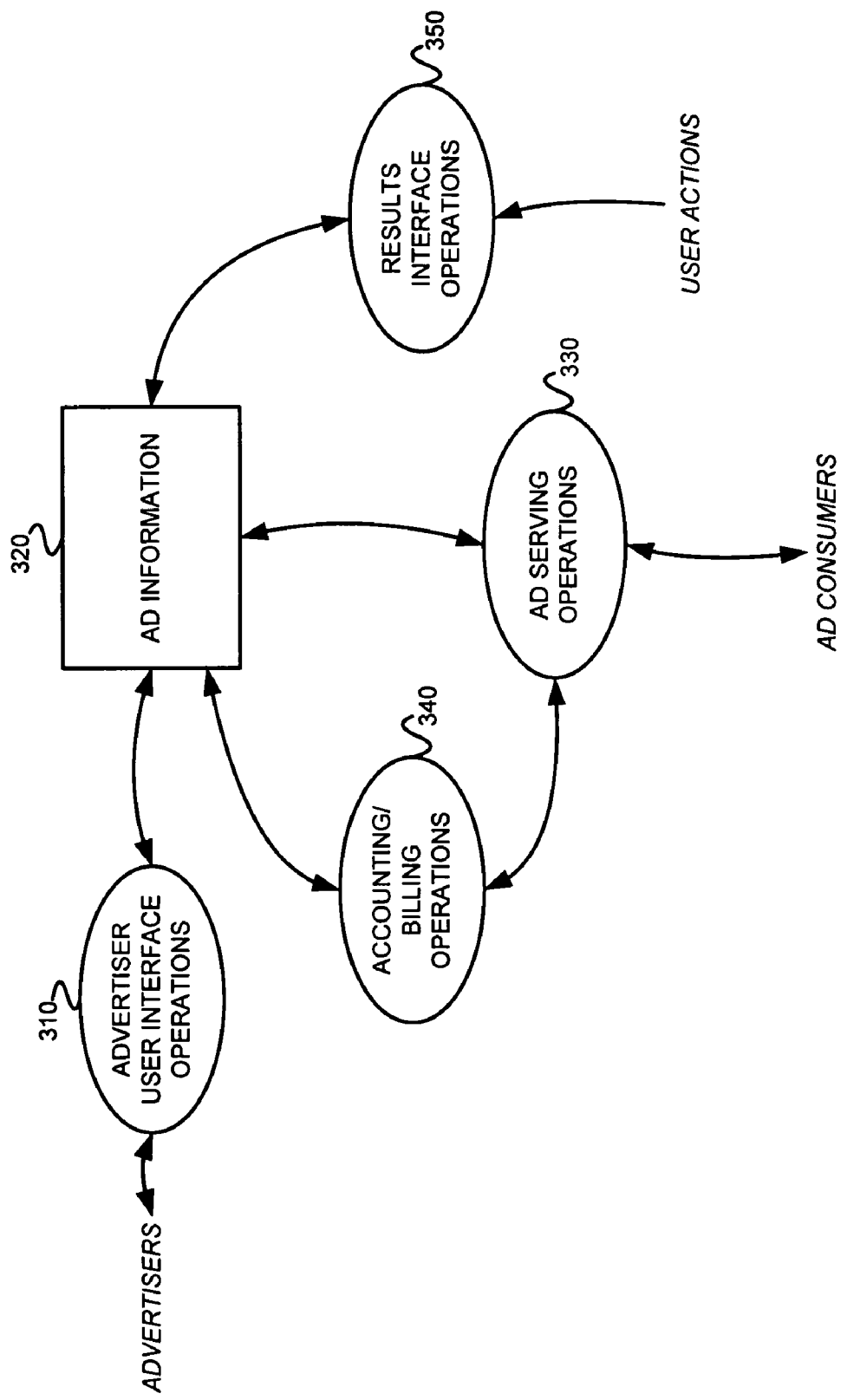
FIG. 3 is a bubble diagram of exemplary operations that may be performed in a manner consistent with the present invention, as well as information that may be used and/or generated by such operations.

FIG. 3 is a bubble diagram of exemplary operations for of an advertising network consistent with the present invention, as well as information that may be used and/or generated by such operations. The operations include, for example, advertiser user interface operations 310, ad serving operations 320, accounting and billing operations 340 and results interface operations 350. The information may include ad information 320. Each of these elements is described below.

Advertiser user interface operations 310 may be used to allow advertiser to interact with the advertising network. For example, advertisers can enter and manage ad information 320 via the advertiser user interface operations 310. Campaign (e.g., targeting) assistance operations (not shown) can be employed to help advertisers generate effective ad campaigns.

Ad consumers (e.g., search engines 220, content servers 230, offline content providers 232, offline ad spot property owners 234 and/or email servers 240) may interface with the advertising network via the ad serving operations 330. The ad serving operations 330 may service requests for ads from such ad consumers. The ad serving operations 330 may determine relevant candidate ads for a given request. The ad serving operations 330 may then score those ads to determine a final set of one or more of the candidate ads, as well as presentation attributes of such ads (e.g., placement, treatments, etc.)

Ad consumers and/or users may also interface with the advertising network via results interface operations 350. The results interface operations 350 may be used to accept information about user actions (such as whether or not a click-through occurred, whether or not a conversion occurred, etc.) Such user action information may include information to identify the ad and time the ad was served, as well as the associated result.

Accounting/billing operations 340 may be used to determine compensation due to the ad network (and perhaps some additional parties, such as content owners, ad spot property owners, etc.) from the advertisers.

The ad information 320 may include one or more of ad account information, ad performance information, advertiser account information, etc. For example, an advertising program may include information concerning accounts, campaigns, creatives, targeting, etc. The term "account" relates to information for a given advertiser (e.g., a unique email address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include various targeting information (referred to as "serving constraints") and associated offer. Each ad group may have one or more ads or "creatives" (That is, ad content that is ultimately rendered to an end user.). Each ad or ad group may be associated with one or more landing pages. An ad may be associated with a landing page using a link, such as a hyper-text link for example, to a URL of the landing page. Naturally, the ad information may include more or less information, and may be organized in a number of different ways.

The ad information 320 may also include account balance information. This information may be updated based on advertiser payments and/or receivables determined by accounting/billing operations 340.

As mentioned above, the ad information 320 may also include ad performance information. This information may be updated based on user actions (impressions, selections, conversions, etc.) received by the results interface operations 350.

In at least some embodiments consistent with the present invention, different advertisers with different value propositions can express those value propositions directly (e.g., in terms of offers to an advertising network). Advertisers can choose to interact with an ad network by sharing their value proposition at different levels of specificity. A high level of specificity may correspond directly with an advertiser's ultimate end goals, whatever they may be. Less specificity may correspond to more complex, subtle, or less-understood value propositions to the advertiser. For example, an advertiser may use conversion-tracking to indicate that a user purchased a book from their affiliate Website resulting in a 15% commission on the price of the book—this is a highly specific value proposition. In contrast, an automobile advertiser may be interested in impressions of a BMW creative which it believes will enhance its brand and will therefore ultimately benefit the company in a subtle way that is hard to measure but that ultimately results in value—this coupling of the advertiser's value proposition to impressions is very non-specific. In the case of non-specific value propositions, advertisers may not fully understand their value-proposition. Even if an advertiser has good data on the probability of a valued event (e.g., a conversion), it may prefer to keep those data private and not share it with an advertising network.

Figure 4:
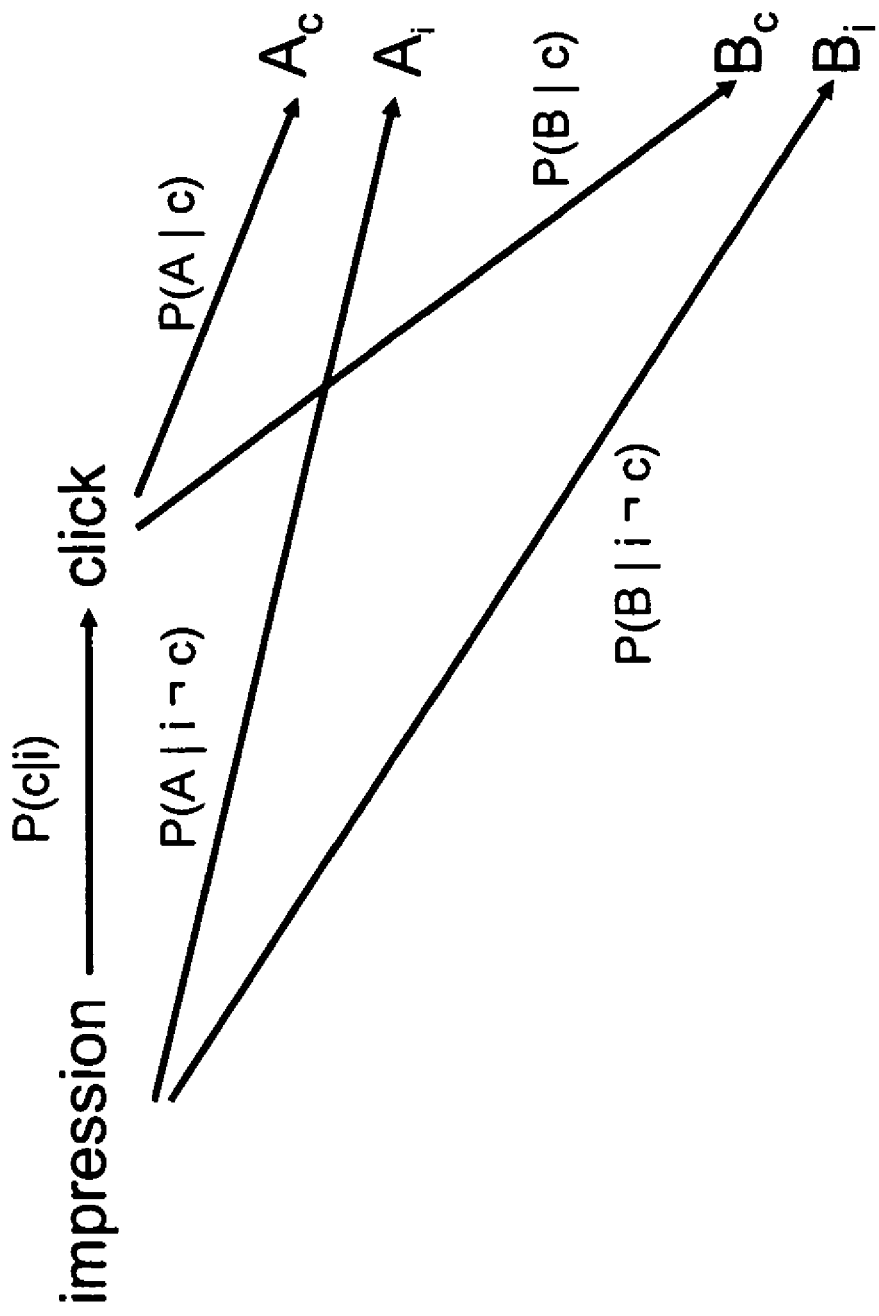
FIG. 4 illustrates different notions of advertiser value and how they can be determined.

Embodiments consistent with the present invention may use some notion of the value of an event, as expressed by an advertiser, as well as a probability of that event occurring. FIG. 4 illustrates different notions of advertiser value and how they can be determined. FIG. 4 illustrates four different events—impression, click, and two advertiser-defined events (A and B). The impression and click events are both "immediate" (the ad serving system measures them directly), while the A and B events are both "deferred" (the advertiser needs to report them to the advertising network in order for the ad network to know about them). The event A (and similarly for event B) can occur via two different ways: $A_i$ and $A_c$. $A_i$ occurs due to an impression only (no click). That is, under event $A_i$, the user received the ad impression, did not select the ad, but nonetheless had the desired behavior. $A_c$ occurs only after an ad is selected (clicked). That is, the user received the ad impression, clicked on the ad, and then had the desired behavior. The value to the advertiser of the event A will often be independent of whether the event was via impression only, or via impression and selection. To state it differently, typically to the advertiser, the value of $A_i = A_c$. Thus, to the extent that an advertiser specifies offers for specific events, the value of the events should be independent of how the event occurred.

In FIG. 4 and the following, when used in the context of a probability, the symbol "|" denotes a conditional probability and the symbol "¬" denotes negation. The edges in FIG. 4 are annotated with the probabilities of a user taking actions corresponding to the event. For example, on the edge from "impression" to "click" is the probability of a click given an impression (P(c|i)). This probability is commonly referred to as the click-through-rate (CTR). The two edges leading to event B are the probability of event B given a click (P(B|c)) and given only an impression (P(B|¬c)). Note that P(B|c)≧ P(B|i) because the occurrence of a click implies the occurrence of an impression (and the inequality is strict iff P(c|i)< 1). Furthermore, it is generally expected that P(B|i¬c)<P(B|c), though it is possible for P(B|i¬c)>P(B|c) (For example, a great creative that targets a poor landing page (e.g., a server-down or an offensive site) could result in better advertiser-defined conversions for users who only saw the ad but did not click it.).

§4.3.1 Exemplary Methods and Data Structures

Figure 5:
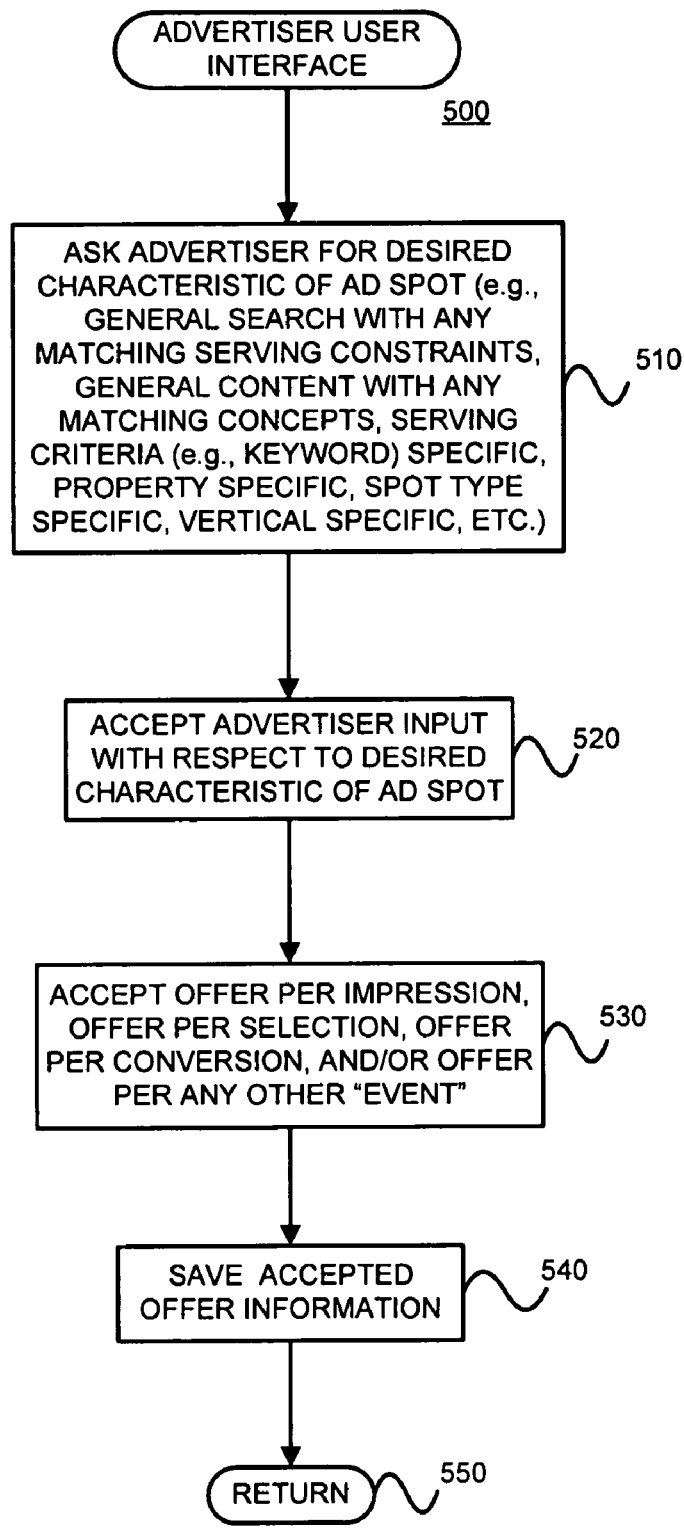
FIG. 5 is a flow diagram of an exemplary method for providing an advertiser user interface in a manner consistent with the present invention.

FIG. 5 is a flow diagram of an exemplary method 500 for providing an advertiser user interface in a manner consistent with the present invention. As shown, an advertiser may be asked (e.g., via an input display screen) for a desired characteristic of an ad spot. (Block 510) The advertiser input with respect to a desired characteristic of an ad spot is then accepted (Block 520), as is one or more offers for an event (e.g., impression, selection, conversion, etc.) related to the ad spot (Block 530). The accepted offer information is then saved (Block 540) before the method 500 is left (Node 550).

Referring back to block 510, the desired characteristic of an ad spot may be, for example, (A) an ad spot returned with a search result page in which any targeting criteria of the ad are met, (B) an ad spot returned with a search result page in which a particular targeting criteria of the ad is met, (C) an ad spot on a content page with a concept matching any targeting concepts of the ad, (D) an ad spot on a content page with a concept matching a particular targeting concept of the ad, (E) an ad spot on a specific (e.g., online or offline) property, (F) an ad spot in a specific vertical, (G) a specific type of ad spot type (e.g., animation only, video only, etc.), etc.

Referring back to block 520, more than one desired ad spot characteristic may be entered by the advertiser. In such a case, the acts of blocks 530 and 540 may be repeated for each desired as spot characteristic entered.

FIG. 6 is an exemplary template 600 through which an advertiser can specify desired ad spot characteristics and enter different types of offers. This template 600 allows advertisers to provision offers (e.g., bids) that represent and track their value closely, even as independent factors beyond their control (e.g., CTR and other conversion rates) change. The template 600 includes a desired characteristic of ad spot column 610, a value per impression column 620, a value per selection (e.g., click) column 630, and a column 640 for entering arbitrary events, values per event, and probability of such an event.

In principle, the first row 650 the template 600 is sufficient to capture the entire value proposition for advertisers. However, in at least some embodiments consistent with the present invention, advertisers are not given an opportunity to report impression-to-conversion rates. Such embodiments should allow advertisers to specify per-impression offers. Furthermore, because many advertisers may not wish to enable conversion tracking, some embodiments consistent with the present invention may allow advertisers to input offer information (e.g., allow some server-side provisioning of offers per selection).

Search row 660 may be used to accept an advertiser's baseline offer(s). The values of offers for specific serving constraints (e.g., keywords) (rows 662) may be populated to be the same by default, but can be separately changed by the advertiser. Similarly, content row 670 may be used to accept an advertiser's baseline offer(s). The values of offers for specific publications (e.g., specific Websites) (rows 672) may be populated to be the same by default, but can be separately changed by the advertiser. Some embodiments consistent with the present invention may require the content default offer(s) to be some minimum value if any publications have offers (i.e., the advertiser either needs a content default offer above the minimum, or it needs to be opted out of content). Other embodiments consistent with the present invention may relax this restriction to allow advertisers to run only on publications that they specifically mention and make an offer on.

Referring to rows 662, offers per impression, and/or selection corresponding to specific keywords (or some other serving constraints) may be accepted. In at least some embodiments, these rows are used only for search advertising.

Referring to rows 672, offers per impression, and/or selection corresponding to specific publications (e.g., Website) may be accepted. Similarly, referring to rows 680, offers per impression, and/or selection corresponding to specific verticals (For examples of "verticals," see, e.g., U.S. patent application Ser. No. 11/112,716 (referred to as "the '176 patent" and incorporated herein by reference), filed on Apr. 22, 2005, titled "CATEGORIZING OBJECTS, SUCH AS DOCUMENTS AND/OR CLUSTERS, WITH RESPECT TO A TAXONOMY AND DATA STRUCTURES DERIVED FROM SUCH CATEGORIZATION," and listing David Gehrking, Ching Law and Andrew Maxwell as inventors.) may be accepted. In at least some embodiments consistent with the present invention, publications are considered more specific than verticals. In at least some embodiments consistent with the present invention, these rows 672,680 are used only for contextual advertising.

As can be appreciated from the foregoing, the template 600 allows advertisers to separately value selections (e.g., clicks) between content and search. The feature is advantageous in embodiments where advertisers not using conversion tracking. This is because advertisers may want some way of making explicit the differential deferred conversion probabilities of events that they are not willing to share with the advertising network. For example, WINZIP may choose to offer $0.40 for content selections and $0.60 for search selections to reflect that it has data that shows a higher conversion rate for selections from search advertising. Each offer may reflect two value components—(1) the specific value of getting a user to the ad landing page, which corresponds to the value of a selection ($V_{selection}$), and the pro-rated value of a deferred private conversion event ($P_{conversion\ event} * V_{conversion\ event}$). By aggregating these two value components into a single per-click bid, the ad network is unable to properly "smart price" (See, e.g., U.S. patent application Ser. No. 10/880,972 (referred to as the '972 application and incorporated herein by referrence), filed on Jun. 30, 2004, titled "ADJUSTING AD COSTS USING DOCUMENT PERFORMANCE OR DOCUMENT COLLECTION PERFORMANCE," and listing Brian Axe, Doug Beeferman, Amit Patel, Nathan Stoll and Hal Varian as inventors.) this offer. This is because smart pricing should only discount the first component, but not the second component, since the second component already represents advertiser value accurately. Discounting an offer reflecting both components would be undesirable. There are three alternative sets of embodiments consistent with the present invention to account for this. Under the first set of embodiments, smart pricing is eliminated. Under the second set of embodiments advertisers are allowed to indicate whether the $V_{selection}$ component should be smart-priced. Under the third set of embodiments, separate bids for the smart-priced and non-smart-priced click values are collected. The first set of embodiments is advantageous in its simplicity. This should not be a problem since advertisers are able to enter separate offers for different content. (Recall, e.g., rows 672 of FIG. 6.) Moreover, allowing the advertiser to enter offers for arbitrary events (Recall, e.g., row 650 of FIG. 6.) may do a better job than smart-pricing.

Referring back to rows 662, the template 600 further supports incremental per-keyword (or some other serving constraint) offers on specific search keywords. In some embodiments consistent with the present invention, this offer may replace the "baseline" search offer (row 660), while in other embodiments consistent with the present invention, the per-keyword offers are added to the baseline search offer (and can be thought of as incremental value offers) instead of replacing the baseline search offer.

In addition to allowing advertisers to make specialized selection offers, the template 600 also allows advertisers to make offers corresponding to specialized values associated with different types of impressions. For example, the template 600 allows different offers for search impressions and content impression, as well as incremental offers per keyword, per content, per vertical, etc. These are most simply understood as extra value that the advertiser offers to represent their desire for placement with certain search results pages, or on certain publications (e.g., Websites) (e.g., because the deferred conversions are higher for such keywords, publications, verticals). Note also that allowing advertisers to make per-publication differential offers has the additional benefit of attracting the best publishers to participate in the ad network.

Naturally, the advertiser user interface have more or less options for the advertiser to express their value of events (e.g., in terms of an offer) than those shown in template 600. For example, the user interface may be much simpler, perhaps beginning with a choice among several of the most common advertiser desires (e.g., "Do you want impressions, selections, value-based bidding, or an advanced interface"). In such embodiments, each of the options may then have a user interface (e.g., a different template) tuned to how different segments of advertisers may value different events (or value simplicity of interacting with the advertising system).

Figure 7:
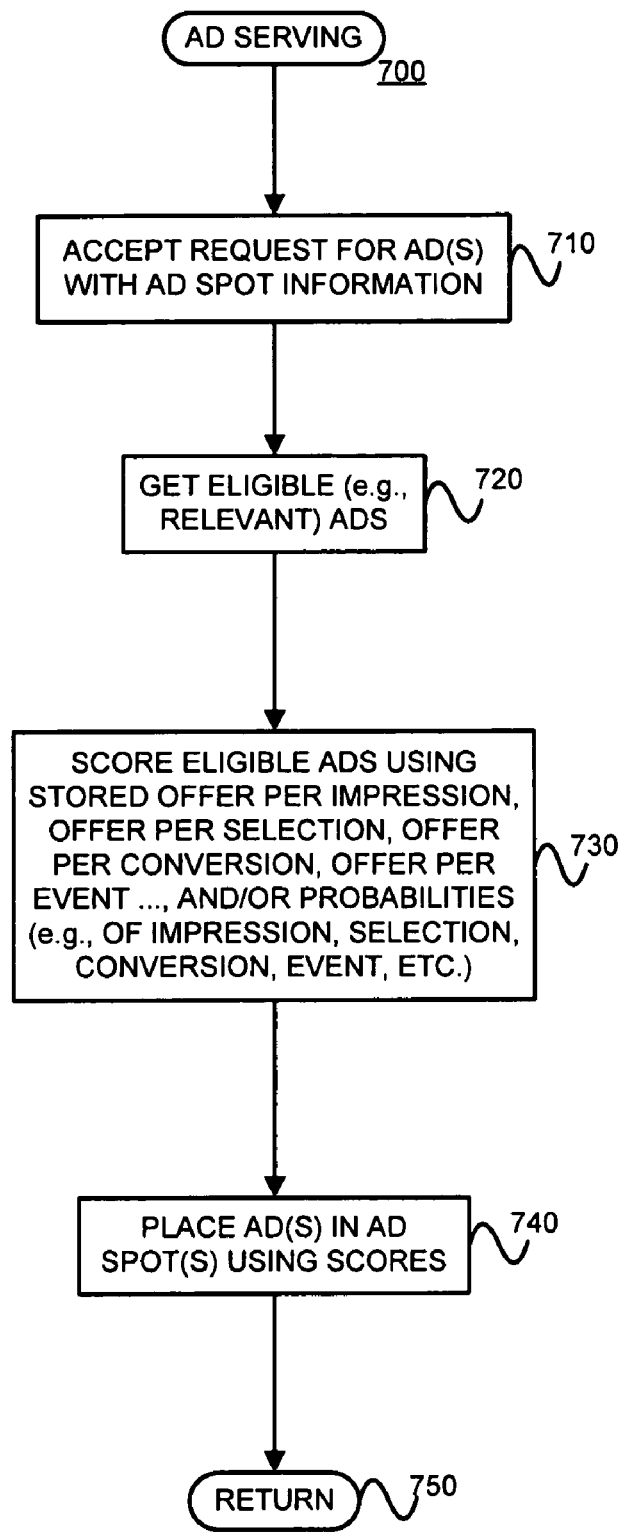
FIG. 7 is a flow diagram of an exemplary method for serving ads in a manner consistent with the present invention.

FIG. 7 is a flow diagram of an exemplary method 700 for serving ads in a manner consistent with the present invention. A request for ads (which may include ad spot information) is accepted. (Block 710) Eligible ads (e.g., those relevant to the request) are obtained. (Block 720) The obtained eligible ads are then scored using stored offer per impression, offer per selection, offer per conversion, offer per some other event, and/or probabilities (of impression being perceived, of selection, of conversion, of event, etc.). (Block 730) The ads are then placed in ad spots using the scores (Block 740) before the method 700 is left (Node 750).

Referring back to block 710, the ad spot information may include search query terms that generated a search page with ad spots, information about content of a document with ad spots, information about an offline property or publication with ad spots, etc.

Referring back to block 720 eligible ads may be determined by comparing serving constraints used to target the serving of the ads with ad spot information. For example, targeting keywords may be compared with search query terms. As another example, targeting keywords may be compared with document information. As yet another example, geotargeting information may be compared with a location of a client device on which a Webpage with ad spots will be served. Naturally, there are many different ways of determining whether or not an ad is eligible (e.g., relevant).

Referring back to block 730, the score (or a component thereof) may be an estimated cost per (thousand) impressions ("CPM"). The AdWords advertising network from Google current uses the following formula for each candidate ad:

$$eCPM = CPC \cdot CTR \quad [1]$$

This can be generalized by considering that a click is just an immediate event that has a value $V_{click}$ (i.e., the CPC) and a probability $P_{click}$ given the ad being served (i.e., the CTR). Thus, the current AdWords scoring technique can be expressed as:

$$eCPM = V_c \cdot P_c \quad [2]$$

In at least some embodiments consistent with the present invention, various offers (e.g., per impression offers, per selection offers, per conversion offers, and per event offers) (Recall, e.g., potential offers of template 600 of FIG. 6.) are summed to compute the eCPM. At least one of the offers needs to be non-zero.

Since whether or not some events will occur is not known with certainty prior to serving the ads, estimated probabilities that the events will occur (e.g., CTRs) may be used. Thus, in the general case:

$$eCPM = \Sigma_{\forall E}(V_E \cdot P_E) \quad [3]$$

where E is the set of all events (which may include impressions, selections, conversions) the advertiser values.

Regarding impressions, some embodiments consistent with the present invention may set $P_i = 1.0$. However, other embodiments consistent with the present invention may adjust this probability in view of the fact that certain ad spots are less likely to be perceived (e.g., seen) than others. (See, e.g., U.S. patent application Ser. No. 11/093,753 (referred to as "the '753 application and incorporated herein by refererence), filed on Mar. 30, 2005, titled "ADJUSTING AN ADVERTISING COST, SUCH AS A PER-AD IMPRESSION COST, USING A LIKELIHOOD THAT THE AD WILL BE SENSED OR PERCEIVED BY USERS," and listing Brian Axe, Gregory Joseph Badros and Rama Ranganath as inventors.) This may be reflected in a modified notion of an impression, or by a separate "perception" or "sensing" event.

In embodiments consistent with the present invention in which advertisers can express their value in impressions, selections (clicks), and/or other events, the score may be expressed as:

$$eCPM = V_i \cdot P_i + V_c \cdot P_c + \Sigma_{\forall e}(V_e \cdot P_e) \quad [4]$$

where e is the set of advertiser-defined events that they value.

The scoring techniques using equations [3] and [4] above work well when the advertiser is using conversion tracking to report all events that provide value to them. Unfortunately, however, many advertisers do not (and will not) use conversion tracking. Further, even advertisers that do use conversion tracking might not be able to report all events. For example, NIKE might report much of its value non-specifically because it's value stems from offline merchandise sales that rarely, if ever, can be tied to specific ad impressions or selections. In this example, suppose that NIKE estimates that there is a 0.0001 probability that a user who received a NIKE ad impression will purchase their shoes offline, and that the purchase gives them a $15.00 value on average. Thus, NIKE might assign an offer for an impression corresponding to be the product of the probability of a valued event given an impression and the value of the event to NIKE; namely=0.0001*$15.00=$0.0015. This corresponds to a $15.00 CPM offer (because CPM=offer per impression*1000). NIKE may additionally estimate that the probability of a similar offline purchase after the selection of an ad is 0.03. That means that NIKE's offer per selection would be the probability of a valued event given a selection and the value of the event to NIKE; namely=0.03*$15=$0.45. In this example, NIKE should offer $0.015 for each impression and $0.45 for each selection.

On the other hand, WINZIP may derive some value from view-through conversions (e.g., users that learn about the product's existence and later do a search and download or buy the software), some value from advertiser visiting the landing page, some value from the trial of the software, and further value from the final conversion in purchasing the software.

Referring back to block 740, ads may be placed in ad spots (e.g., vertically arranged ads in a side margin of a Webpage) using the scores. Some embodiments consistent with the present invention may enforce some minimum eCPM (and/or some minimum performance) for the ad to be allowed to be placed in any ad spot, or in a particular ad spot. Alternatively, or in addition, ads may be provided with enhanced treatments (e.g., better fonts, better color styles, designs, images, animation, audio, video, etc.) depending on their score.

Figure 8:
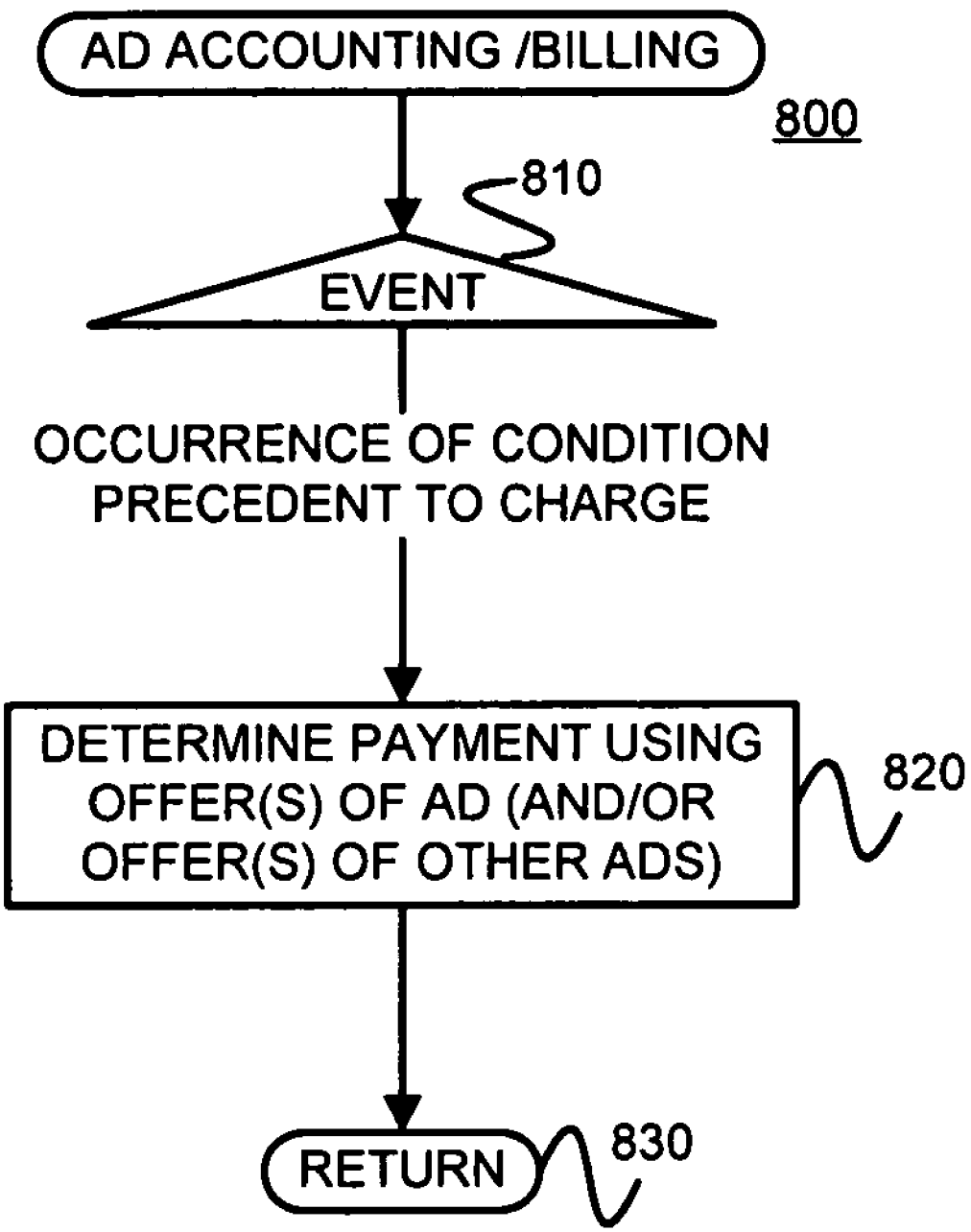
FIG. 8 is a flow diagram of an exemplary method for billing advertisers in a manner consistent with the present invention.

FIG. 8 is a flow diagram of an exemplary method 800 for billing advertisers in a manner consistent with the present invention. As shown, upon the occurrence of a condition precedent to charging the advertiser (Block 810), a payment is determined using the offer(s) associated with the advertiser's ad (and/or offers of other competing ads) (Block 820), before the method 800 is left (Return Node 830).

Referring back to event 810, there may be various conditions precedent to charging an advertiser. For example, under at least some embodiments consistent with the present invention (option 1), the advertiser is charged only at the time of user ad selection (click) for the whole eCPM computed for the score. For example, the charge may be set to the ratio eCPM/CTR for each click. Under this first option, the payment might be determined as follows:

$$V_{impression} \cdot \text{the estimated number of impressions given selection} + \quad [5]$$

$$V_{selection} \cdot 1 + \sum_{\forall \text{ other events } E} V_E \cdot P(E|\text{selection})$$

Under at least some other embodiments consistent with the present invention (option 2), the advertiser is charged only at impression time for the eCPM computed for the score. This means advertisers may be charged a prorated, predicted-click fee, rather than paying only for actual clicks. Under this second option, the payment might be determined as follows:

$$V_{impression} \cdot 1 + V_{selection} \cdot P(\text{selection}|\text{impression}) + \quad [6]$$

$$\sum_{\forall \text{ other events } E} V_E \cdot P(E|\text{impression})$$

Under at least some other embodiments consistent with the present invention (option 3), the advertiser is charged for impressions at the time of impression, and selections (and perhaps other events with offers) at the time of selection (if any). Under this third option, the payment might be determined as follows:

$$\text{at time of impression:} V_{impression} \cdot 1; \quad [7]$$

and $$\text{at time of selection (if any):} V_{selection} \cdot 1 +$$

$$\sum_{\forall \text{ other events } E} V_E \cdot P(E|\text{selection})$$

Under at least some other embodiments consistent with the present invention (option 4), the advertiser is charged for impressions at the time of impression time, selections at the time of selection (if any), and other events at the time of the occurrence of those other events. Under this fourth option, the payment might be determined as follows:

at time of impression: $V_{impression} \cdot 1$;

at time of selection (if any): $V_{selection} \cdot 1$; and at time of each other event (if any): $V_{event} \cdot 1$ [8]

Naturally, in each case, the charge may reflect the advertiser's various offers for various events. In at least some embodiments consistent with the present invention, the amount charged may depend on offers associated with other competing ads (such as corresponding to payment (discounting) techniques described in U.S. patent application Ser. No. 10/340,543 (referred to as "the '543 application" and incorporated herein by reference), filed on Jan. 10, 2003, titled "AUTOMATED PRICE MAINTENANCE FOR USE WITH A SYSTEM IN WHICH ADVERTISEMENTS ARE RENDERED WITH RELATIVE PREFERENCES," and listing Eric Veach and Salar Arta Kamangar as inventors, and U.S. patent application Ser. No. 10/340,542 (referred to as "the '542 application" and incorporated herein by referenced), filed on Jan. 10, 2003, titled "AUTOMATED PRICE MAINTENANCE FOR USE WITH A SYSTEM IN WHICH ADVERTISEMENTS ARE RENDERED WITH RELATIVE PREFERENCE BASED ON PERFORMANCE INFORMATION AND PRICE INFORMATION" and listing Eric Veach and Salar Arta Kamangar as inventors, and U.S. patent application Ser. No. 11/169,323 (referred to as "the '323 application" and incorporated herein by reference), titled "USING THE UTILITY OF CONFIGURATIONS IN AD SERVING DECISIONS," filed on Jun. 28, 2005 and listing Amit Patel and Hal Varian as inventors.

The second option has some attractive characteristics. Unfortunately, however, the second option may be disadvantageous for advertisers that want to be assured of actual selections before payment. Advertisers, to maximize their value, need to trust the predictive ability of the system in estimating the frequency of clicks. Much of the marketing surrounding CPC-based advertising stresses "pay only for real clicks" and that attractive feature is not available under the second option.

Embodiments consistent with the third option and the present invention could batch impressions into thousands (or some other predetermined number) before recognizing the billable event.

As mentioned above, in some embodiments consistent with the present invention, if an ad is served, the probability of impression may be set to one. However, in some other embodiments, the probability of impression may be the probability that the ad will be perceived or sensed by a user.

Referring back to FIG. 6, in embodiments in which an advertiser specifies an incremental cost for a more specifically defined ad spot, the applicable baseline and specific offers should be combined. On the other hand, in embodiments in which an advertiser specifies an absolute cost for a more specifically defined ad spot, only the most specific (or expensive) applicable offer should be considered. In either case, offers used (or not used) in scoring ads should be used (or not be used) in determining a charge for the advertiser.

§4.3.2 Exemplary Apparatus

FIG. 9 is a block diagram of apparatus 900 that may be used to perform at least some operations, and store at least some information, in a manner consistent with the present invention. The apparatus 900 basically includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930.

The one or more processors 910 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 920 and/or may be received from an external source via one or more input interface units 930.

In one embodiment, the machine 900 may be one or more conventional personal computers. In this case, the processing units 910 may be one or more microprocessors. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 932, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 910 through an appropriate interface 930 coupled to the system bus 940. The output devices 934 may include a monitor or other type of display device, which may also be connected to the system bus 940 via an appropriate interface. In addition to (or instead of) the monitor, the personal computer may include other (peripheral) output devices (not shown), such as speakers and printers for example.

Referring back to FIG. 2, one or more machines 900 may be used as end user client devices 250, content servers 230, search engines 220, email servers 240, and/or ad servers 210.

§4.3.3 Refinements and Alternatives

In some of the embodiments described above, the score was determined as eCPM. Naturally, the score may be determined using additional factors. For example, a corrective factor to model the end user's value proposition could be added. More specifically, such a corrective factor may be used to prevent advertisers that value impressions (without some level of user interest expressed via clicks or deeper conversions) from overly dominating the arbitration for ad spots.

In at least some embodiments consistent with the present invention, incentives could be provided to advertisers to increase offers for certain types of ad spots and/or certain types of events (e.g., impression offers for a "travel" vertical). For example, one incentive might be to decorating any ad that has at least a $5.00 CPM offer with the miniature icon of that advertiser's brand. Naturally, other incentives are possible.

In at least some embodiments consistent with the present invention, a publisher (or a property owner), a network of publishers (or property owners), and/or an advertising network might offer an advertiser one or more incentives to make a larger spending commitment, or to commit to advertise across a wider range of properties (e.g., Web pages, Websites, publications, billboards, buses, etc.) One example of such an incentive would be to increase the score of an advertiser's ad(s). Such an increase could be applied to the scores of the advertiser's ad(s) in multiple ad spots. For example, the ad network might agree to increase the scores (used in arbitrations) of the ad(s) of the advertiser over a certain time period (e.g., a month) if the advertiser commits to spend at least a certain amount of money (e.g., $5000.00) over the time period. In this way, the ad network can consider a factor, in addition to eCPM, in ad scoring. Another example of such an incentive would be to discount (more than normal) the advertiser's payment(s).

§4.4 Examples of Operations

In the following simple examples, assume that the following two ads are competing for an ad spot:
AD 1: Nike
search:
    keywords: sneaker, nike, footwear, sports, . . .
    impression offer for any keyword match: $20.00/1000 impressions
    impression offer for keyword "sneaker": +$2.00/1000 impressions
    impression offer for keyword "footwear": +2.00/1000 impressions
content
    any publication or property: $20.00/1000 impressions
    "sports illustrated" publication: +$30.00/1000 impressions
    sports vertical: +$10.00/1000 impressions
AD 2: Striderite
CTR=0.08
search:
    keywords: footwear, shoes, striderite, strideright, toddler, . . .
    impression offer for any keyword match: $2.00/1000 impressions
    click offer for any keyword match: $1.00/click
    click offer for keyword "striderite": +$0.75/click
    click offer for keyword "strideright": +0.75/click
content:
    any publication or property: $0.20/click
    any publication or property: $1.00/1000 impressions
    "parenting" publication: +$5.00/click
    "parenting" publication: +$5.00/1000 impressions Suppose that a search results page with an ad spot was generated in response to the query "footwear". The ads would score as follows:

$$score_{nike} = \$20.00/1000 + \$2.00/1000 = \$22.00/1000 = \$0.022$$

$$score_{striderite} = \$2.00/1000 + \$1.00*0.08 = \$0.002 + \$0.080 = \$0.082.$$

Thus, in this first scenario, the AD2 for Striderite scored higher than AD1 for Nike.

Now suppose that a Webpage (from neither "Sports Illustrated", nor "Parenting") relevant to footwear has an ad spot. The ads would score as follows:

$$score_{nike} = \$20.00/1000 = \$0.020$$

$$score_{striderite} = \$1.00/1000 + \$0.20*0.08 = 0.001 + 0.016 = 0.017$$

Thus, in this second scenario, the AD1 for Nike narrowly beat the AD2 for Striderite.

Finally, suppose that a Webpage from the "Parenting" Website, that is relevant to footwear, has an ad spot. The ads would score as follows:

$$score_{nike} = \$20.00/1000 = \$0.020$$

$$score_{striderite} = \$1.00/1000 + \$5.00/1000 + \$0.20*0.08 + \$5.00*0.08 = 0.001 + 0.005 + 0.016 + 0.400 = 0.422$$

Thus, in this second scenario, the AD2 for Striderite would handily beat the AD1 for Nike.

As the foregoing examples illustrate, different advertisers are able to express their value propositions (e.g., in terms of different types of offers for different types of ad spots). It is believed that this flexibility will lead to strong advertiser adoption.

Embodiments consistent with the present invention can use different ways of determining ad score. For example, the score may be determined using additional factors such as degree of relevance, end user utility, etc.

§4.5 Conclusions

As can be appreciated from the foregoing, embodiments consistent with the present invention can be used to allow advertisers to make offers on events and/or properties that closely reflect their value propositions. Assuming that their value propositions are relatively static, such embodiments will reduce the need for advertisers to change offers frequently (e.g., due to changes in selection rates).

Such embodiments will also be attractive to premium, top-tier publishers because they allow advertisers to pay more for impressions (or for other events) on those publications. This allows premium publishers (and indeed publishers favored by certain advertisers, whether "premium" or not) to monetize the additional value advertisers place on those publishers (e.g., on the publishers' brands). This should eliminate the need for a direct sales force, which is currently used can extract value from publisher brand. Thus, such embodiments should reduce publisher overhead.

Embodiments consistent with the present invention that support content-only offers (as opposed to offers for both content and search) are expected to speed the adoption of image and Flash-based ad creatives.

What is claimed is:

1. A computer-implemented method comprising:
a) accepting, with a computer system including one or more computers on a network, from a first advertiser, a per-selection offer that specifies an amount that the first advertiser is willing to pay when an advertisement of the first advertiser is selected by a user;
b) accepting, with the computer system, from a second advertiser, a per-impression offer that specifies an amount that the second advertiser is willing to pay when an advertisement of the second advertiser is displayed to the user;
c) determining, with the computer system, a first score for the advertisement of the first advertiser using the per-selection offer of the first advertiser and an estimated click-through rate of the advertisement of the first advertiser;
d) determining, with the computer system, a second score for the advertisement of the second advertiser using the per-impression offer of the second advertiser;
e) comparing, with the computer system, the first score and the second score;

f) when the first score is greater than the second score, placing, with the computer system, the advertisement of the first advertiser in a candidate ad spot and charging the first advertiser a first monetary amount only if the advertisement is selected by the user; and g) when the second score is greater than the first score, placing, with the computer system, the advertisement of the second advertiser in the candidate ad spot and, in response to presenting the second advertisement to the user, charging the second advertiser a second monetary amount.

2. The computer-implemented method of claim 1 wherein each of the first score and the second score is an estimated cost per impression.

3. The computer-implemented method of claim 1 wherein each of the first score and the second score is an estimated discounted cost per impression.

4. Apparatus comprising:
   a) one or more processors;
   b) at least one input device; and
   c) one or more storage devices storing processor-executable instructions which, when executed by one or more processors, perform a method of:
      i) accepting, from a first advertiser, a per-selection offer that specifies an amount that the first advertiser is willing to pay when an advertisement of the first advertiser is selected by a user;
      ii) accepting from a second advertiser, a per-impression offer that specifies an amount that the second advertiser is willing to pay when an advertisement of the second advertiser is displayed to the user;
      iii) determining a first score for the advertisement of the first advertiser using the per-selection offer of the first advertiser and an estimated click-through rate of the advertisement of the first advertiser;
      iv) determining a second score for the advertisement of the second advertiser using the per-impression offer of the second advertiser; and
      v) comparing the first score and the second score;
      vi) when the first score is greater than the second score, placing the advertisement of the first advertiser in a candidate ad spot and charging the first advertiser a first monetary amount only if the advertisement is selected by the user; and
      vii) when the second score is greater than the first score, placing the advertisement of the second advertiser in the candidate ad spot and, in response to presenting the second advertisement to the user, charging the second advertiser a second monetary amount.

5. The apparatus of claim 4 wherein each of the first score and the second score is an estimated cost per impression.

6. The apparatus of claim 4 wherein each of the first score and the second score is an estimated discounted cost per impression.

7. A computer-readable medium having stored thereon computer-readable instructions which, when executed by a computer, perform a method comprising:
   a) accepting from a first advertiser, a per-selection offer that specifies an amount that the first advertiser is willing to pay when an advertisement of the first advertiser is selected by a user;
   b) accepting from a second advertiser, a per-impression offer that specifies an amount that the second advertiser is willing to pay when an advertisement of the second advertiser is displayed to the user;
   c) determining a first score for the advertisement of the first advertiser using the per-selection offer of the first advertiser and an estimated click-through rate of the advertisement of the first advertiser;
   d) determining a second score for the advertisement of the second advertiser using the per-impression offer of the second advertiser;
   e) comparing the first score and the second score;
   f) when the first score is greater than the second score, placing the advertisement of the first advertiser in a candidate ad spot and charging the first advertiser a first monetary amount only if the advertisement is selected by the user; and
   g) when the second score is greater than the first score, placing the advertisement of the second advertiser in the candidate ad spot and, in response to presenting the second advertisement to the user, charging the second advertiser a second monetary amount.

8. The computer-readable medium of claim 7 wherein each of the first score and the second score is an estimated cost per impression.

9. The computer-readable medium of claim 7 wherein each of the first score and the second score is an estimated discounted cost per impression.

\* \* \* \* \*